(12) United States Patent
Jubelirer

(10) Patent No.: US 7,844,303 B2
(45) Date of Patent: Nov. 30, 2010

(54) CABLE MANAGEMENT IN AN FM TRANSMITTER

(75) Inventor: Matthew Jubelirer, San Diego, CA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 11/899,760

(22) Filed: Sep. 7, 2007

(65) Prior Publication Data
US 2009/0068948 A1    Mar. 12, 2009

(51) Int. Cl.
*H04M 1/00* (2006.01)
*H04B 7/00* (2006.01)

(52) U.S. Cl. .............. 455/569.2; 455/41.2; 455/575.2; 439/306; 320/115; 248/229.1

(58) Field of Classification Search ............. 455/41.2, 455/569.1, 575.2; 439/302, 305, 306; 320/114, 320/115; 248/128, 229, 229.1
See application file for complete search history.

(56) References Cited

U.S. PATENT DOCUMENTS

| | | | | |
|---|---|---|---|---|
| 5,992,807 | A * | 11/1999 | Tarulli | 248/206.5 |
| 6,480,378 | B2 * | 11/2002 | Chang | 361/679.41 |
| 6,600,109 | B1 | 7/2003 | Andre et al. | |
| 6,888,940 | B1 * | 5/2005 | Deppen | 379/446 |
| 6,951,480 | B2 * | 10/2005 | Rivera | 439/568 |
| 7,011,538 | B2 | 3/2006 | Chang | |
| 7,194,181 | B2 | 3/2007 | Holmberg et al. | |
| 7,338,328 | B2 * | 3/2008 | Krieger et al. | 439/668 |
| 7,679,322 | B1 * | 3/2010 | Griffin | 320/114 |
| 2003/0236075 | A1 * | 12/2003 | Johnson et al. | 455/99 |
| 2004/0008157 | A1 | 1/2004 | Brubaker et al. | |
| 2004/0029541 | A1 * | 2/2004 | Baranowski et al. | 455/130 |
| 2004/0137967 | A1 * | 7/2004 | Bodley | 455/575.2 |
| 2004/0204163 | A1 * | 10/2004 | Ou | 455/569.1 |
| 2005/0284980 | A1 | 12/2005 | Chang | |
| 2006/0285716 | A1 | 12/2006 | Gordon | |
| 2006/0288388 | A1 | 12/2006 | Harris et al. | |
| 2007/0042709 | A1 | 2/2007 | Krieger et al. | |
| 2007/0093279 | A1 * | 4/2007 | Janik | 455/569.1 |
| 2007/0155440 | A1 | 7/2007 | Everett et al. | |
| 2007/0243909 | A1 * | 10/2007 | Huang | 455/569.1 |

(Continued)

OTHER PUBLICATIONS

"Belkin Media Reader for iPod with Dock Connector" www.mrgadget.com.au/catalog/belkin-media-reader-for-ipod-with-dock-connector-p-1603.html.

(Continued)

*Primary Examiner*—Duc M Nguyen
(74) *Attorney, Agent, or Firm*—Mayer & Williams PC

(57) ABSTRACT

Several of the components used to implement a wireless transmitter, such as a DC-powered FM transmitter usable for playing media content from a personal media player over a vehicle's FM radio, are organized using an arrangement by which a controller that includes a user interface is removably couplable to a charger plug that interfaces with a power source. An arrangement for removably coupling a device connector in the transmitter to the charger plug is also provided. In an illustrative example, the controller and charger plug are configured with magnetic elements which are used to retain the controller against an end of the charger plug using magnetic force. A portion of the device connector is removably insertable into an elastically deformable connector cap that is configured to removably slide over the charger plug end.

19 Claims, 7 Drawing Sheets

U.S. PATENT DOCUMENTS

2008/0041851 A1* 2/2008 Thrapp ........................ 220/229

OTHER PUBLICATIONS

"BruddyClip for iPod shuffle" www.mp3playeraccessories.net/BruddyClip-for-iPod-shuffle.html.

"Delphi SkyFi3 w/Bose Kit" www.crutchfield.com/S-yfRafeeo91F/cgi-bin/ProdView.asp?g=250150&I=040SA10219.

"Belkin TuneCast 3 FM Transmitter" www.crutchfield.com/S-86r9Ptxy0rX/cgi-bin/ProdView.asp?g=225550&tab=detailed_info&i=599F8M010.

* cited by examiner

FIG. 5A
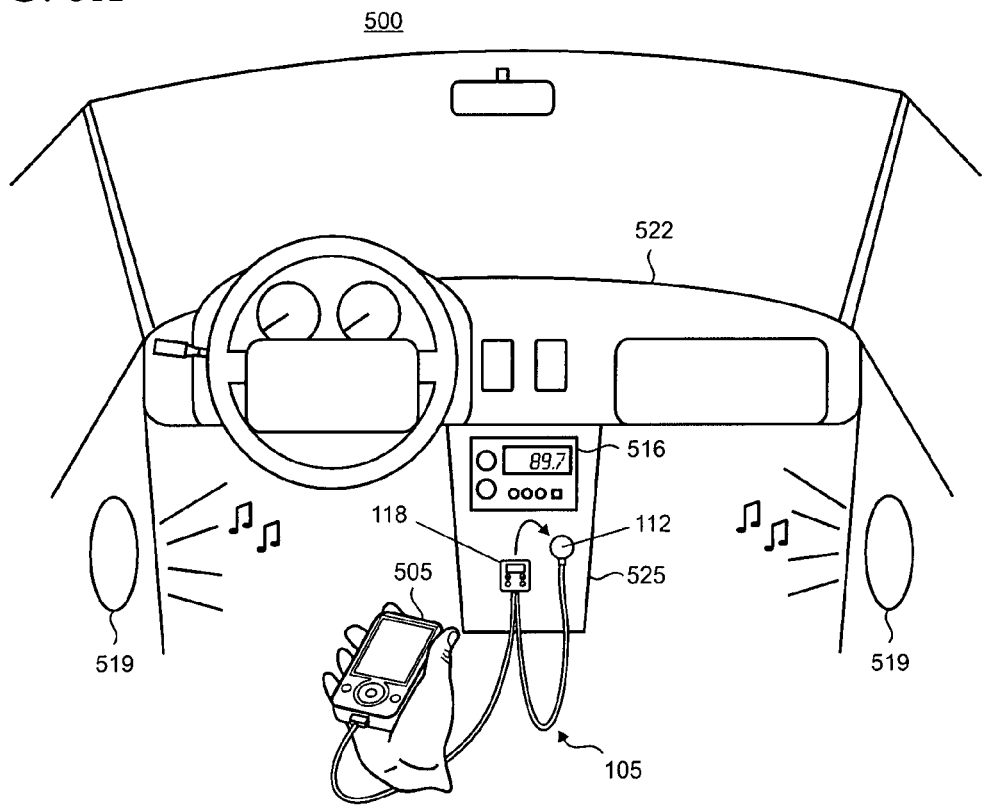
FIG. 5B
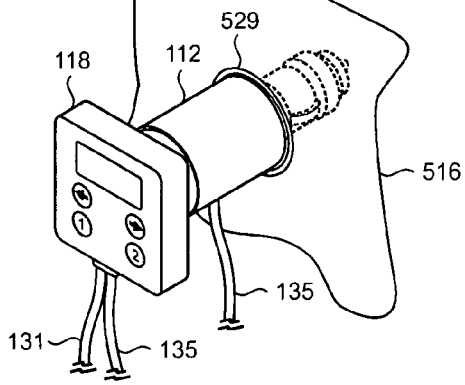
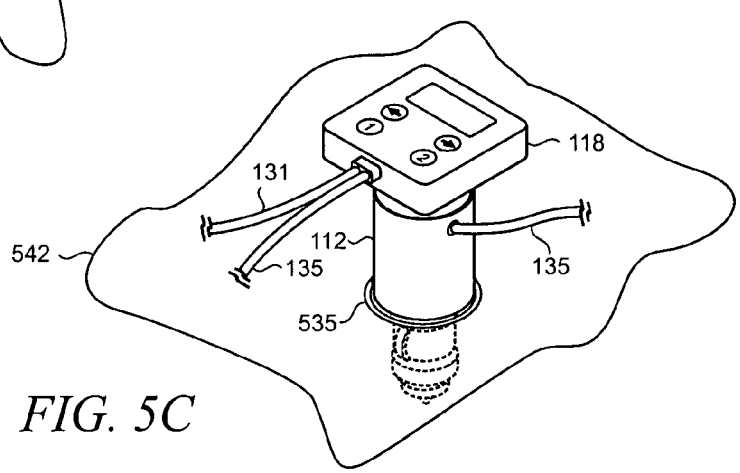
FIG. 5C

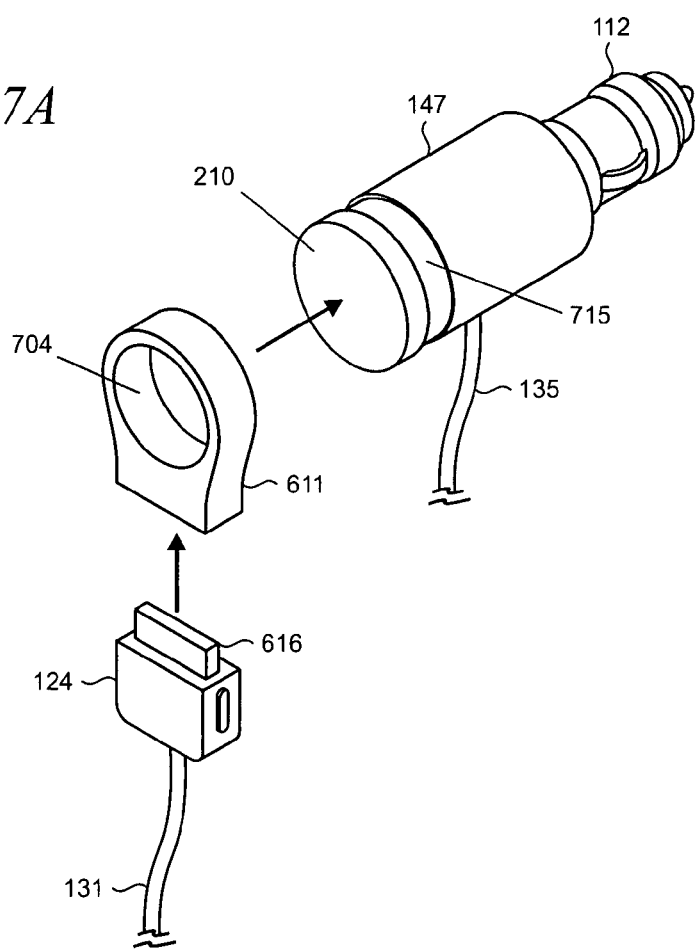
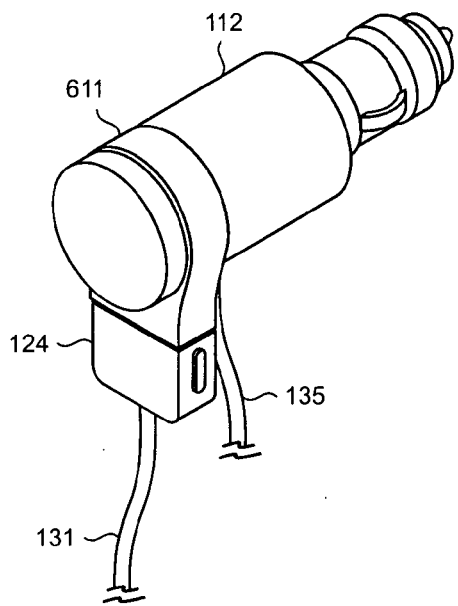

CABLE MANAGEMENT IN AN FM TRANSMITTER

BACKGROUND

Personal media players that render music and video are very popular worldwide. Such devices are typically battery operated and have sufficient memory to enable users to store fairly large catalogs of media content such as digital music encoded in the common MP3 format (Moving Pictures Expert Group, MPEG-1, audio layer 3). To play music from their personal media players in their cars, users often rely on FM (frequency modulation) transmitters that plug into their media players so that the output of the player is transmitted as a radio frequency ("RF") signal which is picked up by the FM radio in the car. The user may typically tune the FM transmitter, using a controller, to transmit on an unused FM channel to minimize interference from regular radio stations. Power for the FM transmitter is commonly accessed using an adapter plug that interfaces with the car's 12 volt DC (direct current) accessory outlet (often termed the "cigarette lighter").

While current FM transmitters provide satisfactory performance in many settings, several interface and packaging considerations could stand improvement. In particular, the FM transmitter controller is not always conveniently accessible in current products. When the FM transmitter is plugged in and operating, the controller may be awkwardly located, or it gets easily lost amid all of the objects that commonly clutter the car's interior. Consumers have also expressed frustration when trying to keep the wires that are commonly used with most FM transmitters neat and tidy when the transmitters are in use and during storage between uses.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Several of the components used to implement a wireless transmitter, such as a DC-powered FM transmitter usable for playing media content from a personal media player over a vehicle's FM radio, are organized using an arrangement by which a controller that includes a user interface is removably couplable to a charger plug that interfaces with a power source. An arrangement for removably coupling a device connector in the transmitter to the charger plug is also provided. In an illustrative example, the controller and charger plug are configured with magnetic elements which are used to retain the controller against an end of the charger plug using magnetic force. A portion of the device connector is removably insertable into an elastically deformable connector cap that is configured to removably slide over the charger plug end.

In an illustrative example, the controller and charger plug are configured with magnetic elements which are used to retain the controller against an end of the charger plug using magnetic force. The device connector is arranged to interface with an electronic device such as a personal media player so that media content from the device may be modulated onto an FM signal that can be received and played over the vehicle's FM radio. A portion of the device connector is removably insertable into an elastically deformable connector cap that is configured to removably slide over the charger plug end.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 5A shows an illustrative car environment in which a personal media player renders music through the car's FM radio;

FIG. 5B provides of a detailed view of the charger plug within the illustrative car environment shown in FIG. 5A;

FIG. 5C shows an alternative orientation of the charger plug within the illustrative car environment;

FIG. 7A shows the connector cap prior to being placed on the charger plug, and the device connector prior to being coupled to the connector cap;

FIG. 7B shows the connector cap as installed on the charger plug and the device connector stowed in the connector cap;

Like reference numerals indicate like elements in the drawings.

DETAILED DESCRIPTION

Figure 1:
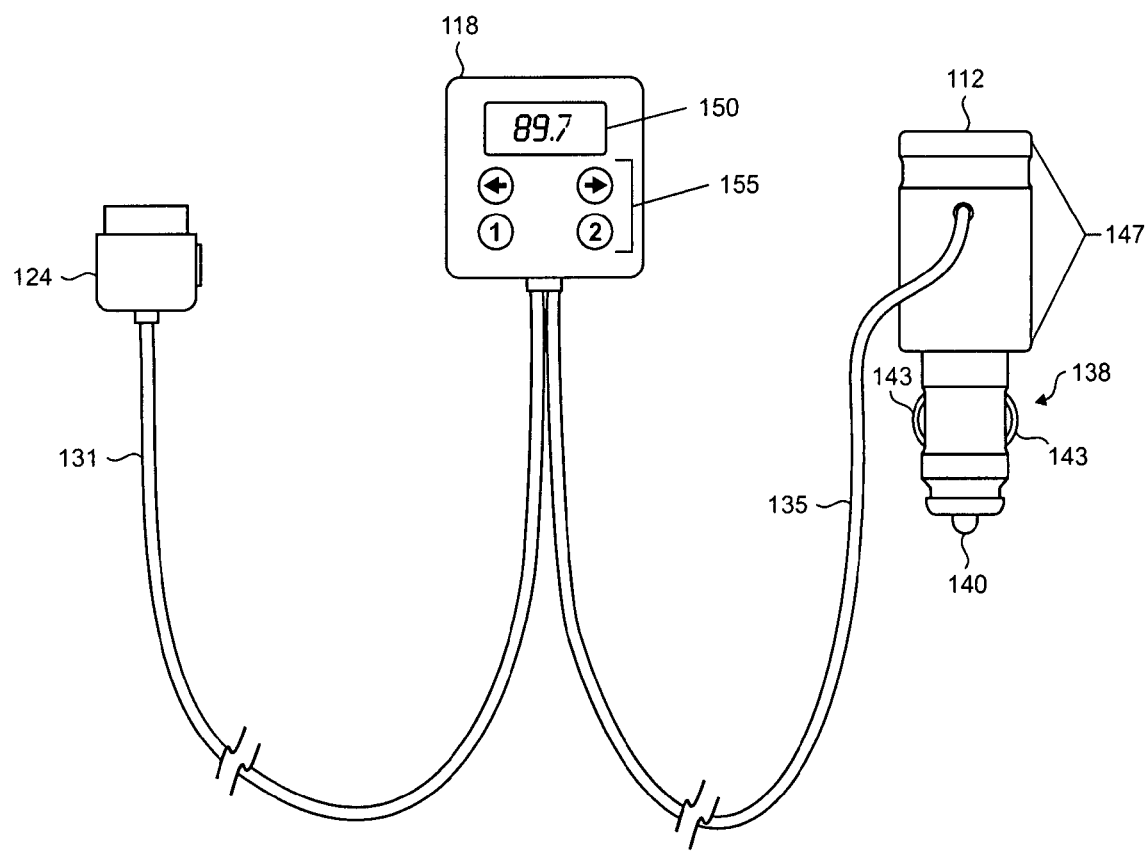
FIG. 1 shows the major functional components of an illustrative FM transmitter, including a charger plug, controller, and device connector, with which the present cable management arrangement is applicable.

FIG. 1 shows the major functional components of an illustrative FM transmitter 105 which is configured to be coupled to a personal media player (not shown) in order to play media content from the media player such as music, audio books, and other recordings over an FM radio which is typically located in a car, truck, motorcycle, boat or other type of vehicle. FM transmitters are also commonly referred to as FM modulators. Personal media players that are usable with the present arrangement can vary, but will typically include one of multimedia player, pocket PC (personal computer), CD player (compact disc), DVD player (digital versatile disc), smart phone, mobile phone, handheld game device, personal digital assistant, or other type of electronic device that can store and/or render media content such as audio, video, or multimedia.

FM transmitter 105 includes a charger plug 112, controller 118, and device connector 124, with which the present cable management arrangement is applicable. While an FM radio environment is anticipated as being the most typical application due to the large installed base of FM radios in cars and other vehicles, it is emphasized that the present wire management arrangement is not necessarily limited to such environments and may be applied to other types of wireless transmitters where cables need to be organized or managed in a convenient way for the user.

Controller 118 is positioned between the charger plug 112 and device connector 124 with cables 131 and 135, as shown. Wires 131 and 135 each house multiple discrete conductors which are used to transmit various signals, for example, power, data and control signals, between the constituent elements of the FM transmitter 105. The lengths of the wires 131 and 135 can vary according to the requirements of a specific application. Generally, the wires 131 and 135 will have sufficient free length to enable connection of the charger plug 112 to a power source in the vehicle such as a cigarette lighter or accessory socket, while simultaneously providing enough slack to enable a user to conveniently connect to, and operate the personal media player. However, the length of wires 131 and 135 need to be kept short enough to reduce the potential for entanglement with key operating or safety controls in the vehicle. In this illustrative example, wires 131 and 135 are approximately equal in length so that the controller 118 is centrally located between the charger plug 112 and device connector 124.

Charger plug 112 includes a vehicle power interface portion 138 that includes a positive conductor 140 and several ground conductors 143 that interface with respective counterparts in a vehicle power source which is typically a lighter or accessory socket that provides nominally 12 VDC. Other common names for functionality provided by the charger plug 112 include "car charger" or "car adapter." Charger plug 112, in this illustrative example, also includes a body portion 147 that may be utilized, for example, to house a portion or all of the circuitry utilized to implement the RF functionality provided by the FM transmitter 105. A variety of alternative FM transmitter circuits may be utilized depending on the features and functionalities that are desired to be implemented. Typically, such circuits will be implemented using one or more integrated circuits and provide some degree of tune-ability, either user- or automatically-implemented (or using a combination of the two) in order to locate, and then transmit over an unused FM channel to the vehicle's radio. In implementations where auto-tuning is utilized, the FM transmitter 105 may also incorporate an FM receiver, transceiver, to evaluate characteristics of potentially available channels over which the FM transmitter 105 may transmit.

Controller 118 provides a user interface to the FM transmitter 105 including a display 150 and a variety of controls, which are implemented here as buttons 155. Display 150 is typically used to indicate operating status to the user, as well as enable the user to control certain functions provided by the FM transmitter 105 such as manual selection of FM channels. Controller 118 may also be configured to house additional circuitry beyond that used to implement the user interface. For example, it may be desirable in some applications to place portions or all of the FM transmitter circuit within the controller 118.

In this illustrative example, device connector 124 is configured to interface with an external port such as an accessory, audio-visual ("A/V") port, or multi-purpose port of a personal media player. In some implementations, the device connector will vary according to the particular personal media device being used. In this case, the device connector 124 is generally arranged as a device-specific or proprietary connector. In other implementations, the device connector 124 can utilize a form factor provided by a standardized connector, for example, a USB (Universal Serial Bus) or IEEE-1394 connector (Institute of Electrical and Electronics Engineers). Whether standardized or proprietary, the device connector 124 will generally enable stored media content such as music or audio to be played from the personal media player, received by the FM transmitter 105 and converted (i.e., modulated) as an FM signal at a particular frequency. If the vehicle's radio is tuned to that FM signal frequency, then the media content played by the personal media player will be received and played as if it were a regular FM radio broadcast.

In alternative arrangements, the device connector 124 may be configured to house portions or all of the FM transmitter circuit and/or controller functionality including the user interface.

Figure 2A:
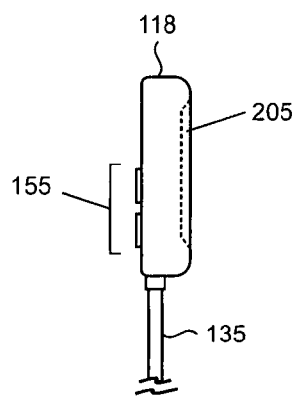
FIGS. 2A and 2B show side and back views, respectively, of the illustrative FM transmitter controller shown in FIG. 1.
Figure 2B:
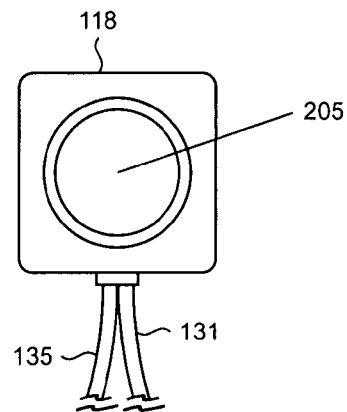
Figure 3A:
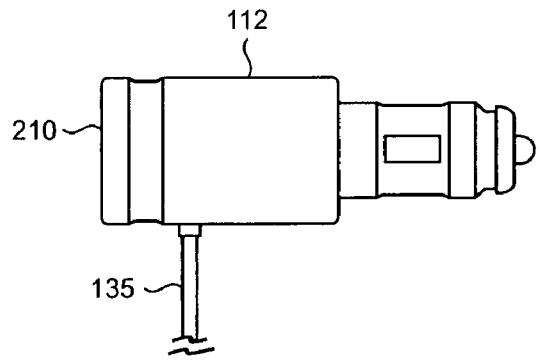
FIGS. 3A and 3B show side and front views, respectively, of the illustrative charger plug shown in FIG. 1.
Figure 3B:
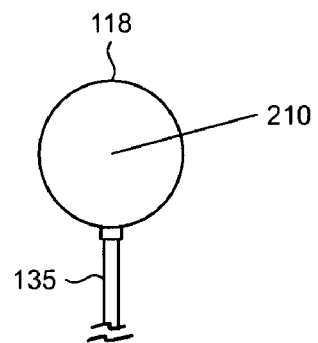
Figure 4A:
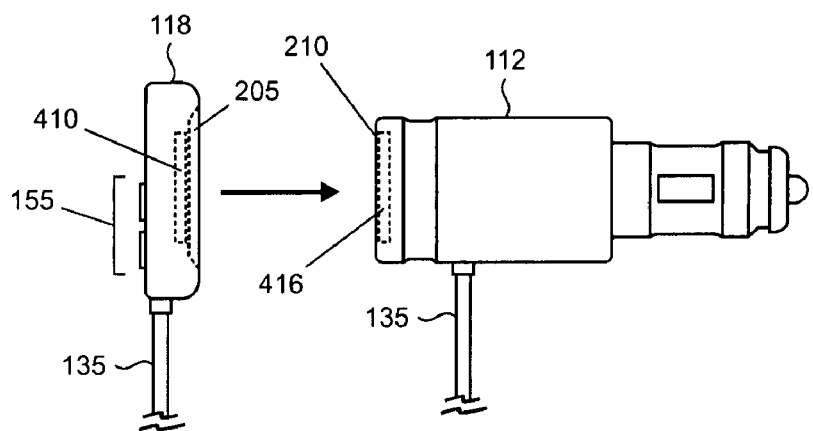
FIG. 4A shows the illustrative controller and charger plug in an operative relationship prior to being magnetically coupled.
Figure 4B:
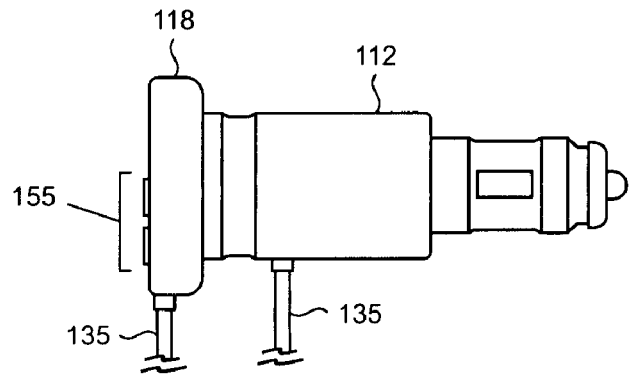
FIG. 4B shows the illustrative controller and charger plug in an operative relationship after being magnetically coupled.

FIGS. 2A and 2B show side and back views, respectively, of the FM transmitter controller 118. As shown, the back of the controller 118 includes a recessed portion 205 that is sized to interface with proximal end 210 of the charger plug 112 (i.e., the end opposite the positive conductor 140). FIGS. 3A and 3B respectively show side and front views of the charger plug 112 including the proximal end 210. Respectively disposed adjacent to the recessed portion 205 and proximal end 210 within the interior of the controller 118 and charger plug 112 are magnetic elements 410 and 416. In this illustrative example, magnetic elements 410 and 416 are permanent magnets having their poles aligned so that the recessed portion 205 and proximal portion 210 will be magnetically attracted when a user moves the controller 118 into proximity with the charger plug 112 as indicated by the arrow in FIG. 4A. When the recessed portion 205 and proximal end 210 come into contact, the controller 118 and charger plug 112 become magnetically coupled as shown in FIG. 4B.

The magnetic force provided by the magnetic elements 410 and 416 is typically selected so that the controller 118 and charger plug 112 are held securely enough to prevent the controller 118 from dislodging from an accidental bump from the user or by the motions normally experienced in a moving vehicle. The magnetic force can be varied by material selection, size, and the relative positioning of the magnetic elements 410 and 416 within the respective controller 118 and charger plug 112. In some applications, rare-earth-type magnets, such as samarium-cobalt or neodymium, may be desirable for use as a result of their high magnetic flux density. Alternatively, a single magnet located adjacent to either the recessed portion 205 or proximal end 210 may be used where its counterpart in the other portion is a ferromagnetic material. Electromagnets may also be used in alternative implementations where it is acceptable for the magnetic coupling to be implementable when power is available to energize the electromagnets.

While magnetic coupling may be preferred in many applications, alternative coupling arrangements may also be utilized. For example, mechanical fasteners such as a hook and loop, or devices such as latches or threaded fastening arrangements may be employed. A fastening arrangement such as a clip using an elastically deformable material, including polymers or metals can also be utilized.

FIG. 5A shows an illustrative car environment 500 in which a personal media player 505 renders music through an FM radio 516 and speakers 519 in a car 522 through utilization of the FM transmitter 105. As shown, the charger plug 112 is plugged into the car's 12VDC accessory outlet in the dashboard 525. The controller 118 may then be magnetically coupled with the charger plug 112, as indicated by the arrow in FIG. 5A. FIG. 5B shows a detailed view of the controller 118 and charger plug 112 when magnetically coupled when the charger plug 112 is plugged into the accessory outlet 529 in the dashboard 525. By coupling the controller 118 to the proximal end of charger plug 112 when the FM transmitter 105 is being used, the controller 118 is out of the way (as generally the user only needs to tune the FM transmitter 105 on an occasional basis), but is still conveniently accessible when needed. However, it is emphasized that the controller 118 does not have to be magnetically coupled to the charger plug 112 for the FM transmitter 105 to operate, and the user may prefer to place the controller 118 in other locations within the car 522 when the FM transmitter 105 is being used.

While accessory outlet and cigarette lighter locations may vary, it is common for these power outlets to be located having openings that are either vertically oriented in the dashboard area of a vehicle, or else are horizontally oriented, for example, in a center console area that is often located between the front seats. Indeed, as the number of electronic devices such as mobile phones and navigation devices commonly used in cars continues to increase, manufacturers are placing a greater number of accessory outlets in various locations throughout the car. FIG. 5C shows a detailed view of the controller 118 magnetically coupled to the charger plug 112 when the charger plug 112 is plugged into an accessory outlet 535 having an opening that is horizontally oriented in a horizontal surface 542 such as a center console in the car 522. Such horizontal orientation of the controller 118 may often typically provide convenient access for the user.

Figure 6A:
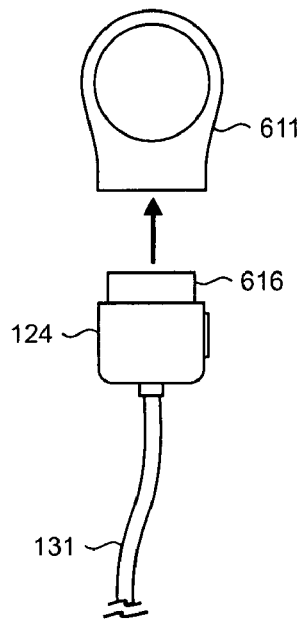
FIG. 6A is a front view of the device connector prior to being stowed in an illustrative connector cap.
Figure 6B:
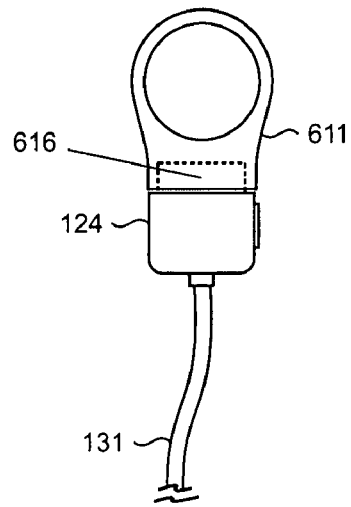
FIG. 6B is a front view of the device connector once it is stowed in the connector cap for storage.

FIG. 6A is a front view of an illustrative connector cap 611 that is utilized in the present wire management arrangement to stow the device connector 124 that is utilized by the FM transmitter 105 (FIG. 1). The connector cap 611 is formed from an elastically deformable polymer that facilitates a close fitting configuration with the extended connector portion 616 of the device connector 124. When the extended connector portion 616 is inserted by the user (as indicated by the arrow in FIG. 6A) into a connector receiving portion of the connector cap 611, the connector cap 611 is slightly elastically deformed which reciprocally subjects the extended connector portion to a compressive force to thereby hold the device connector 124 in place as shown in FIG. 6B.

In alternative implementations, the connector cap may be configured as a metal clip to hold the device connector 124 to the charger plug 112. Hook and loop fasteners are also usable alternative fasteners.

Figure 6C:
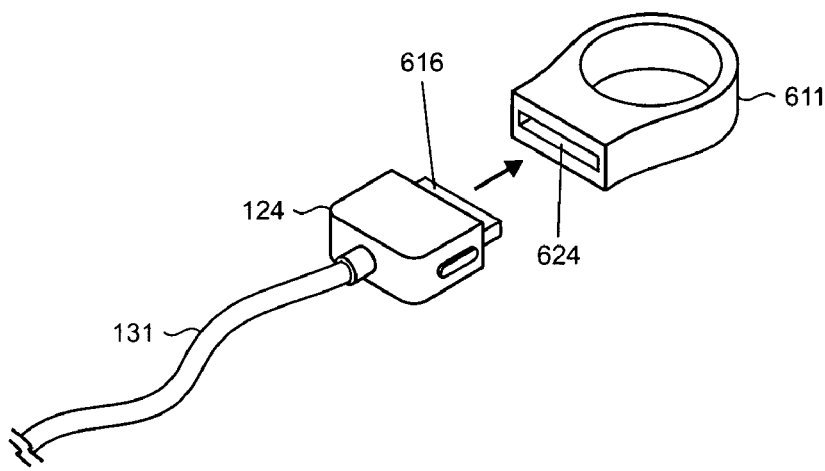
FIG. 6C is an isometric view of the device connector prior to being stowed in connector cap.
Figure 6D:
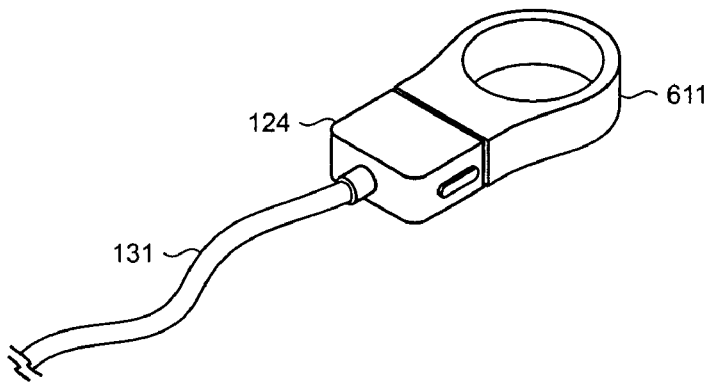
FIG. 6D is an isometric view of the device connector once it is stowed in the connector cap for storage.

FIG. 6C is an isometric view of the connector cap 611 showing the connector receiving portion 624 that is sized to receive the extended connector portion 616 in a close fitting manner. FIG. 6D is an isometric view of device connector 124 after it is stowed in the connector cap 611.

The user will typically place the device connector 124 into the connector cap 611 to stow it away when the FM transmitter 105 is not being used. The connector cap 611 helps to manage and organize the wires in the FM transmitter 105, while also protecting the connector from damage when it is not being used.

As shown in FIG. 7A, the connector cap 611 includes a circular passage 704 having a diameter that is selected to be closing fitting around a corresponding circumferential groove 715 that is disposed in the body 147 adjacent to the proximal end 210 of the charger plug 112. The user installs the connector cap 611 by forcing it over the proximal end 210 to thereby cause sufficient elastic deformation of the passage 704 allowing it to pass over the slightly larger diameter proximal end 210. Once over the proximal end, the user guides connector cap 611 until it seats in the groove 715. The groove 715 locates the connector cap 611 and prevents it from inadvertently slipping off the proximal end 210. Removal of the connector cap 611 from the charger plug 112 is essentially the reverse of the installation procedure.

FIG. 7B shows the connector cap 611 as installed on the charger plug 112 with the device connector 124 stowed in the connector cap 611.

Figure 8A:
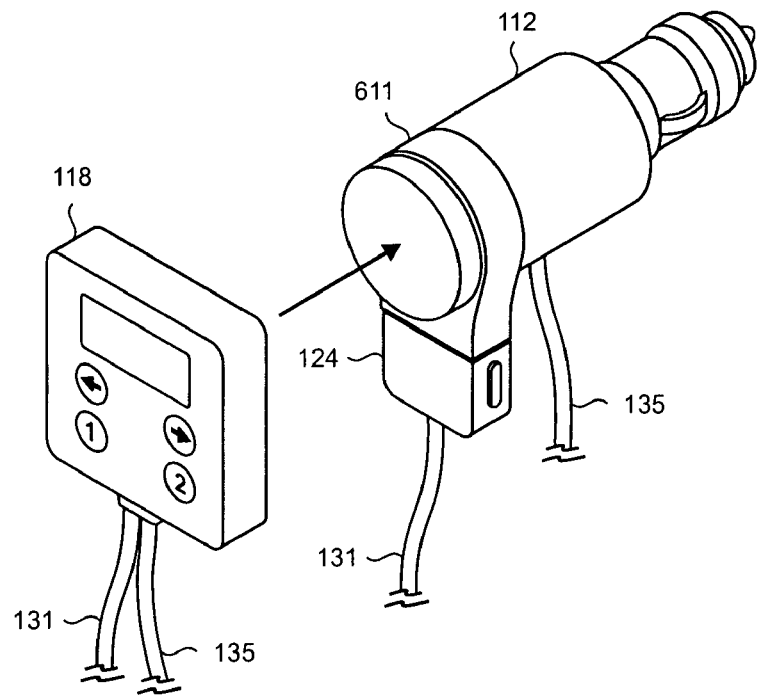
FIG. 8A shows the controller prior to being magnetically coupled to the charger plug for storage.
Figure 8B:
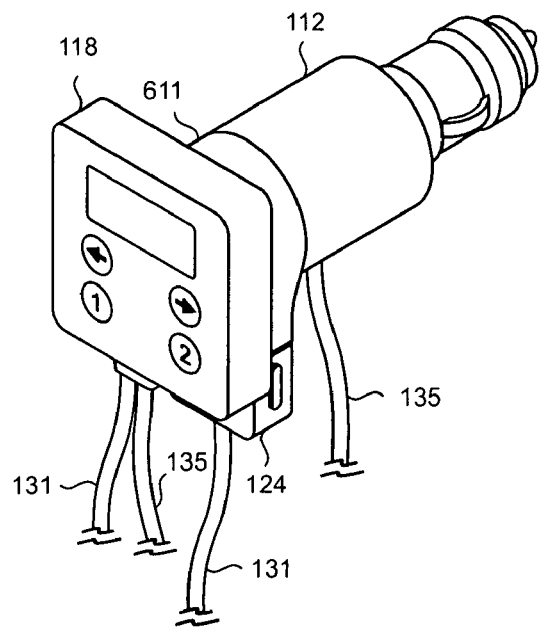
FIG. 8B shows the controller as magnetically coupled to the charger plug for storage.
Figure 9:
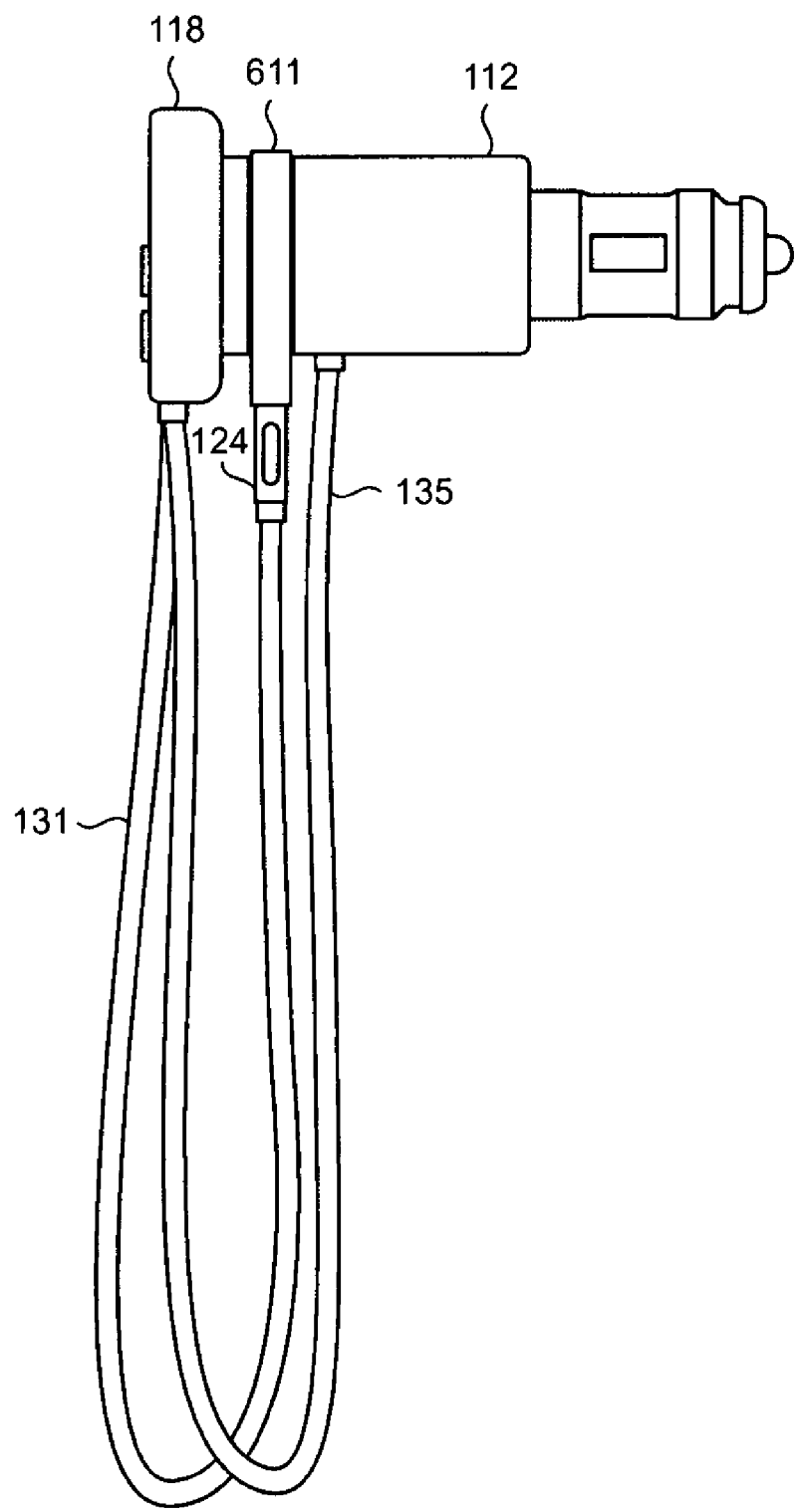
FIG. 9 is a side view of the illustrative FM transmitter with the controller and device connector in their stowed positions.

As shown in FIGS. 8A and 8B the controller 118 may be magnetically coupled to the charger plug 112 to stow it when the FM transmitter 105 (FIG. 1) is not being used. The user will typically perform this action in combination with stowing the device connector 124 in the connector cap 611 as shown in FIGS. 6A-7B and described in the accompanying text. As shown in FIG. 9, when the controller 118 and device connector 124 are stowed with the charger plug 112, the wires 131 and 135 are neatly organized which helps keep the wires tangle-free when the FM transmitter 105 is stored when not being used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A wireless transmitter product, comprising:
   a charger plug including a distal end that is configured to interface with a power outlet and a proximal end that includes a first magnetic element adjacent therewith; and
   a component for housing a functional element of the wireless transmitter product that includes a second magnetic element, the first magnetic element and second element being oriented respectively within the proximal end and the component housing to produce magnetic attraction between the component housing and the charger plug,
   in which the charger plug is configured with a circumferential groove that is arranged for receiving a connector cap.

2. The wireless transmitter product of claim 1 in which the functional element comprises a user interface.

3. The wireless transmitter product of claim 2 in which the user interface includes a display or controls.

4. The wireless transmitter product of claim 1 in which the functional element comprises an FM transmitter.

5. The wireless transmitter product of claim 1 in which the functional element comprises an FM transceiver.

6. The wireless transmitter product of claim 1 in which the connector cap is configured as an elastically deformable body having a through passage that has a inside diameter that is substantially equal to the outside diameter of the circumferential groove so that the connector cap is removably installable in a close fitting manner in the circumferential groove.

7. The wireless transmitter product of claim 1 in which the connector cap includes a device connector slot that is sized to receive a device connector in a close fitting matter so that the device connector is removably insertable into the connector cap.

8. The wireless transmitter product of claim 1 in which the first and second magnetic elements comprise rare earth magnets.

9. The wireless transmitter product of claim 1 in which one of the first or second magnetic elements is a permanent magnet and the other is a ferromagnetic material.

10. An apparatus for coupling a component of a wireless transmitter to a charger plug in the wireless transmitter, comprising:
   an elastically deformable body;
   a first interface disposed within the body for removably receiving the component, the first interface being configured so that, when received, the component causes the body to elastically deform and impart a clamping force on a portion of the component; and
   a second interface disposed within the body for slidably engaging with the charger plug, the second interface being configured so that, when slidably engaged on the charger, the body is elastically deformed.

11. The apparatus of claim 10 in which the elastically deformable body is formed from a polymer.

12. The apparatus of claim 10 in which the second interface comprises a circular through passage that is sized to interface with a circumferentially disposed groove in the charger plug.

13. The apparatus of claim 12 in which the body returns to a substantially un-deformed state when located within the circumferentially disposed groove.

14. The apparatus of claim 10 in which the component includes a device connector that is adapted to interface with an electronic device.

15. The apparatus of claim 14 in which the electronic device is selected from a group consisting of media player, MP3 player, mobile phone, personal digital assistant, smart phone, pocket PC, handheld game device, CD player, DVD player, and combinations thereof.

16. An FM transmitter for use in a vehicle environment comprising:
   a charger plug adapted for interfacing with a DC power outlet in the vehicle and including a first magnetic element at its proximal end;
   a controller coupled to the charger plug with a first wire and including a user interface on a first face and second magnetic element disposed adjacent to a second face of the controller opposite the first face, the first magnetic and second magnetic elements being oriented to generate magnetic attraction between the controller and the charger plug when the second face and the proximal end are in contact; and
   a device connector coupled to the controller with a second wire, the device connector being adapted to interface with a personal media player so that media content stored on the personal media player may be modulated onto a FM signal generated by the FM transmitter that is receivable by an FM radio in the vehicle.

17. The FM transmitter of claim 16 further including an elastically deformable connector cap that includes a first interface for removably receiving a portion of the device connector and retaining the received portion through application of a normal clamping force, and a second interface that is adapted for slideable removable engagement with the charger plug.

18. The FM transmitter of claim 16 in which the first and second magnetic elements are ones of permanent magnets, rare earth magnets, or electromagnets.

19. The FM transmitter of claim 16 in which portions of circuitry used to implement FM transmitter functionality is housed within the controller.

\* \* \* \* \*